March 7, 1933.  C. H. DESAUTELS  1,900,434
CUTTER FOR EXTRUDING MACHINES
Filed April 15, 1929   3 Sheets-Sheet 1

INVENTOR.
Charles H. Desautels.
BY
ATTORNEY.

March 7, 1933.  C. H. DESAUTELS  1,900,434
CUTTER FOR EXTRUDING MACHINES
Filed April 15, 1929   3 Sheets-Sheet 2

INVENTOR.
Charles H. Desautels.
BY
Robert M Harvey
ATTORNEY.

March 7, 1933.                C. H. DESAUTELS                1,900,434
                        CUTTER FOR EXTRUDING MACHINES
                    Filed April 15, 1929        3 Sheets-Sheet 3
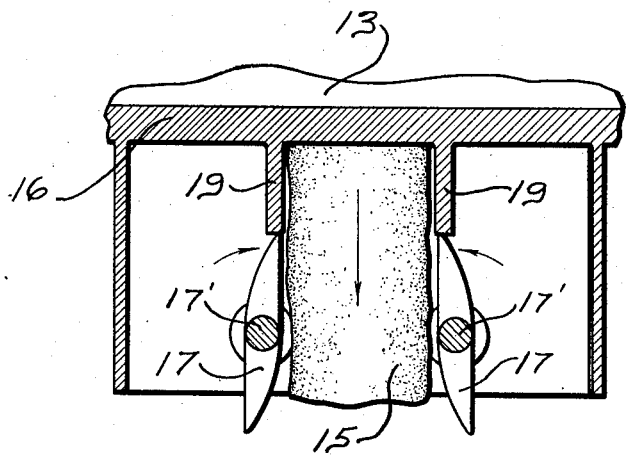
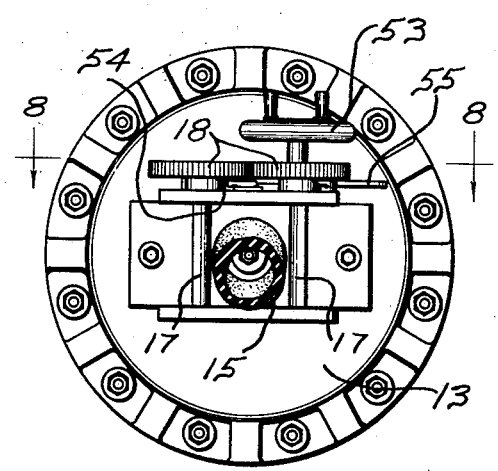
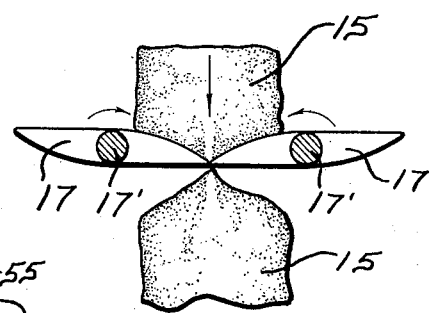
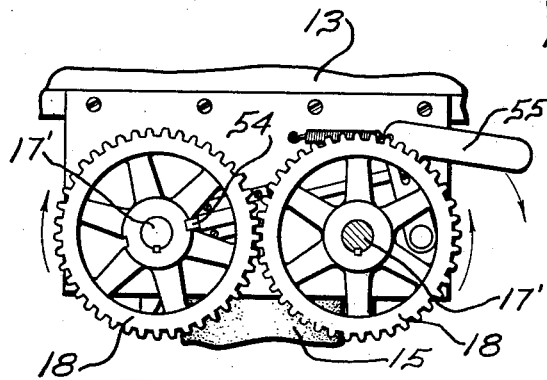
INVENTOR.
Charles H. Desautels.
BY
ATTORNEY.

Patented Mar. 7, 1933

1,900,434

UNITED STATES PATENT OFFICE

CHARLES H. DESAUTELS, OF SPRINGFIELD, MASSACHUSETTS, ASSIGNOR TO THE FISK RUBBER COMPANY, OF CHICOPEE FALLS, MASSACHUSETTS, A CORPORATION OF MASSACHUSETTS

CUTTER FOR EXTRUDING MACHINES

Application filed April 15, 1929. Serial No. 355,168.

My invention relates to a cutter for extruding machines and more particularly to a cutter used in conjunction with an extruding machine particularly adapted to break up and plasticize crude rubber preparatory to milling operations. It has among its objects to provide a cutter which utilizes the outward push of the extruded stock to aid in the cutting operation. Another object is to provide a cutter which does not have to be reset for every cutting. A still further object is to provide a cutter which will be operated automatically in synchronism with the extruding machine so as to cut off the stock in predetermined lengths. Further objects will be apparent in the following specification and claims.

In the drawings which illustrate one embodiment of my invention,

Fig. 5 is a sectional view taken on the line 5—5 of Fig. 1, but on a larger scale;

Fig. 6 is a view similar to Fig. 5 showing the cutters in operation;

Fig. 7 is a view of the head of the machine shown in Fig. 1 equipped with a manually operated cutter embodying my invention; and Fig. 8 is a view taken on the line 8—8 of Fig. 7, but on a larger scale.

Figure 1:
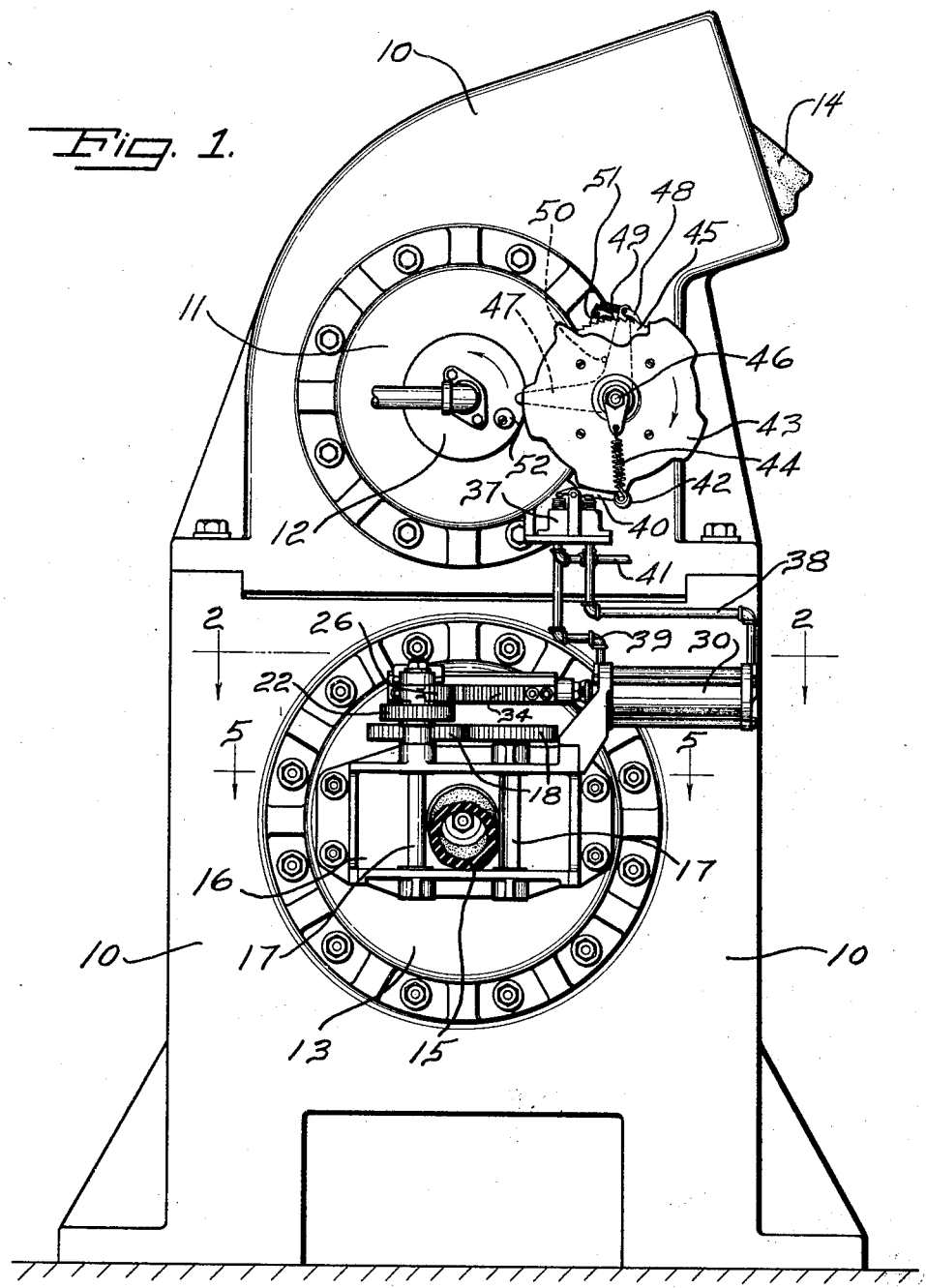
Fig. 1 is a front view of a compound extruding machine or plasticator upon which has been mounted an automatic cutter embodying my invention.

Referring to the drawings with particular reference to Fig. 1, 10 indicates an extruding machine or plasticator of the multiscrew type. The head 11 serves to form a bearing for shaft 12 of the upper feed screw and 13 is the head carrying the forming die of the lower feed screw. The crude rubber 14 is fed to the upper feed screw which forces the stock backward in the machine, then delivers it to the lower feed screw which in turn forces the stock forward through the forming die to form a tube 15. Since this part of the machine is of standard construction and in itself forms no part of my invention further description is believed unnecessary.

For handling purposes it is customary practice to cut this tube 15 into short lengths and to do this I have provided a novel cutter comprising a box-shaped frame 16 bolted to the head 13. A pair of double-edged knives 17 are secured to shafts 17' rotatably mounted in the frame 16 and meshing gears 18 splined to the shafts 17' serve to rotate the knives in opposite directions.

As best shown in Fig. 5, when the knives are in rest position they are parallel to the stock and baffle plates 19 formed in the frame 16 serve to prevent the leading edge of the tube 15 from engaging with the knives when in this position. When a rotative force is applied (by means to be later described) to either of the cutters in the direction of the arrows they will bight into the tube 15 and as the latter continues to move forward, as indicated by the arrow, the tube 15 will exert a pressure on the back of the knives in addition to the applied force until the knives reach the position shown in Fig. 6 when the cutting is completed. Then the knives continue to rotate until they have described an arc of 180° when they will be in the same position as shown in Fig. 5 only the cutting edges will be reversed. In practice it has been found that very little force need be applied, the forward movement of the tube 15 being of such force that the latter will literally cut itself.

Referring to Figs. 1 to 4, inclusive, I have shown one method of mechanically imparting an intermittent rotative force in one direction to one of the knife shafts, the other, of course, acting as a follower through gears 18, will be rotated in the opposite direction. A gear 20 is splined to the driven knife shaft and meshes with two gears 21 and 22 of the same size as gear 20. These gears are rotatably mounted on stud shafts 23 and 24 secured in the frame 16. Segmental gears 25 and 26 are also rotatably mounted on the stud shafts and are locked respectively to the gears 21 and 22. A bridge member 27 bolted to the stud shafts 23 and 24 is formed to guide a slide 28 secured to a piston rod 29 of a two-way cylinder 30 which is secured to the frame 16. A rack 31 and stops 32 and 33 are bolted to one side of the slide 28 while a similar rack 34 and stops 35 and 36 are bolted to the other side. These racks 31 and 34 are positioned to, respectively, engage the gear segments 25 and 26.

Figure 2:
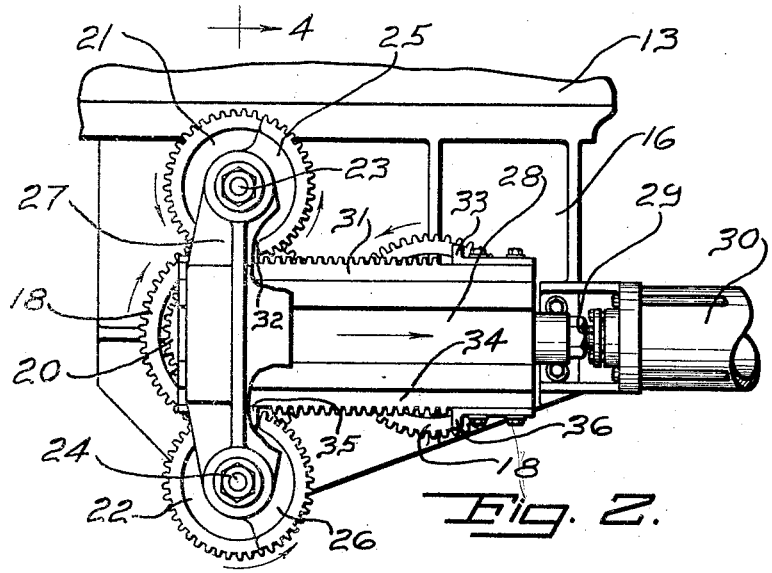
Fig. 2 is a view taken on the line 2—2 of Fig. 1, but on a larger scale.
Figure 3:
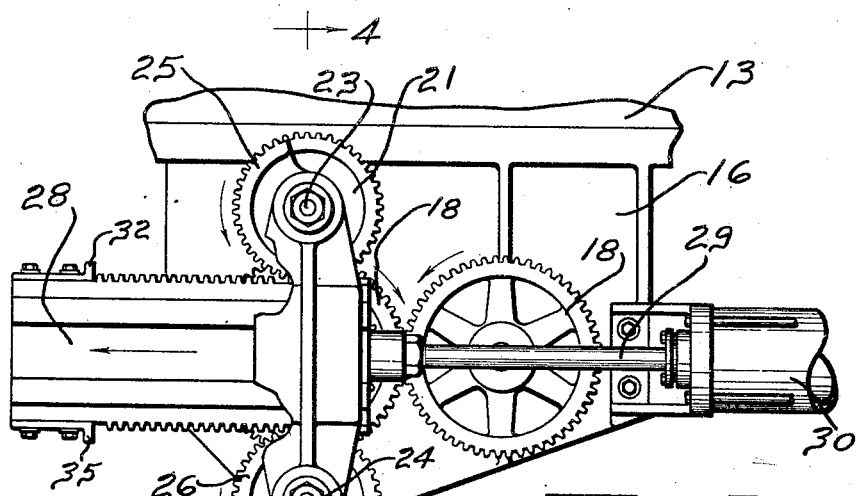
Fig. 3 is a view similar to Fig. 2 showing the position of parts on the next cut from those shown in Fig. 2.
Figure 4:
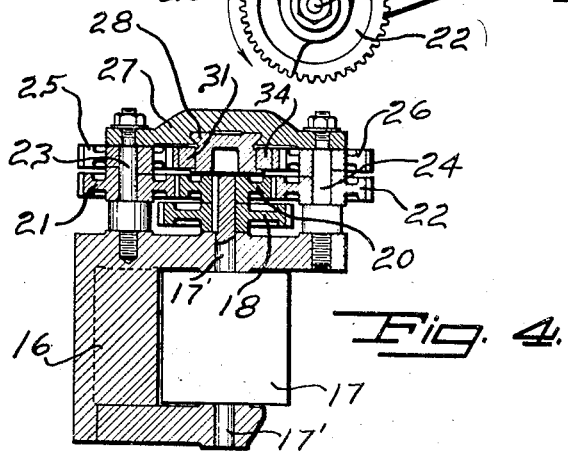
Fig. 4 is a sectional view taken on the line 4—4 of Fig. 2, but on a smaller scale.

Referring to Fig. 2 I have shown the position of parts at the ends of the inward stroke of the two-way cylinder 30, as indicated by the arrows. It is evident that the stop 32 is engaging the gear segment 25 to rotate it in the direction of the arrow, but the gear segment 26 is acting through gears 21, 20 and 22 to hold back the stop 35, thus the parts are in a locked position. When power is applied to the cylinder, by means to be later described, to reverse its stroke the rack 34 engages the segment 26 and the segment 25 will be rotated through the gears 22, 20 and 21 away from the rack 31. This movement continues until the stops 33 and 36 engage the segments 25 and 26, when the apparatus will again be in locked position, as shown in Fig. 3. When the stroke of the cylinder is again reversed the movements will be repeated except that this time the segment 25 will be in engagement with the rack 31 while the segment 26 moves away from the rack 34 and on the end of the stroke the parts will be again in the position shown in Fig. 2.

It can readily be seen that for each stroke of the cylinder the segments 25 and 26 will be rotated 180° in the same direction and as the gears 21, 20 and 22 are of a one to one ratio the gear 20 will be rotated 180° in the opposite direction, as indicated by the arrows. Thus the knife 17 and knife shaft 17', to which the gear 20 is splined, will be rotated 180° for each stroke of the cylinder and also the other knife 17 acting through the one to one ratio gears 18 but in the opposite direction. The locked positions of the parts correspond to the positions of the knives, as shown in Fig. 5, so that at each stroke of the cylinder 30 the knives will perform a cutting as previously described.

The two-way cylinder may be actuated by a suitable manually operated valve of any standard design connected in the power supply line, but I prefer to do this automatically in synchronism with the machine, as in so doing pieces of tubing of equal determinate lengths may be cut without the necessity of an operator.

To accomplish this I have provided a standard valve 37 secured to the upper head 11 and connected to the two-way cylinder 30 by connections 38 and 39 so that by pivoting the operating lever 40 compressed air may be alternately introduced from a supply line 41 into the connections 38 and 39. A roller 42 is mounted on the lever 40 and is held in engagement with a cam 43 by a spring 44. The cam 43 is secured to a ratchet wheel 45 mounted so as to be freely rotatable on a shaft 46 secured to the head 11. A bell crank 47 is also rotatably mounted on the shaft 46 and on one arm is mounted a pawl 48 positioned to engage the ratchet wheel 45. A spring 49 holds the bell crank against a stop 50 when in rest position and a stationary idler pawl 51 is provided to make the pawl action positive. The other arm of the bell crank 47 is positioned to engage a collar 52 eccentrically mounted to the constantly rotating shaft 12 of the upper feed screw. As the shaft 12 revolves the collar 52 engaging with the bell crank 47 will cause the pawl 48 to index the ratchet wheel 45 and the attached cam 43, thus operating the valve 37. Various length cuts may be accomplished by changing the shape of the cam 43 or by adjusting the eccentric mounting of the collar 52, thus controlling the number of teeth indexed by the pawl 48 per revolution of the shaft 12.

In Figs. 7 and 8 I have shown a cutter of modified form which is adapted to be operated manually. A hand wheel 53 is splined to one of the knife shafts and a sliding key 54 operated by a spring-pressed lever 55 engages in grooves formed in the hub of one of the gears 18 to lock the knives in the position shown in Fig. 5 when the apparatus is inoperative.

Having thus described my invention, I claim:

1. A device of the character described comprising a pair of rotatably mounted double-edged cutters, a pair of equal gears splined to the cutter shafts and meshing with each other, means for releasably locking the knives against rotation at two positions 180° apart and means operable to rotate one of the knives.

2. The combination comprising a rubber extruding machine, a pair of rotatably mounted double-edged cutters adjacent the extruding die of the machine and so positioned that the product passes between them and means operable to rotate the knives in the direction of the feed of the product to engage their cutting edges in the product and to present the back surface of the knives to the advancing product to be engaged thereby to aid in the rotating of the knives.

3. The combination comprising a rubber extruding machine, a pair of rotatably mounted double-edged cutters positioned adjacent the die of said rubber extruding machine so that the extruded product will pass between them, a gear secured to each of the cutter shafts and meshing with each other and means operable to automatically rotate one of the cutters intermittently in 180° arcs in one direction and in predetermined timed relation with the extruding machine.

CHARLES H. DESAUTELS.